March 20, 1962 C. E. SCHUTTE 3,026,140
VEHICLE WINDSHIELD ASSEMBLY
Filed March 30, 1959 4 Sheets-Sheet 4

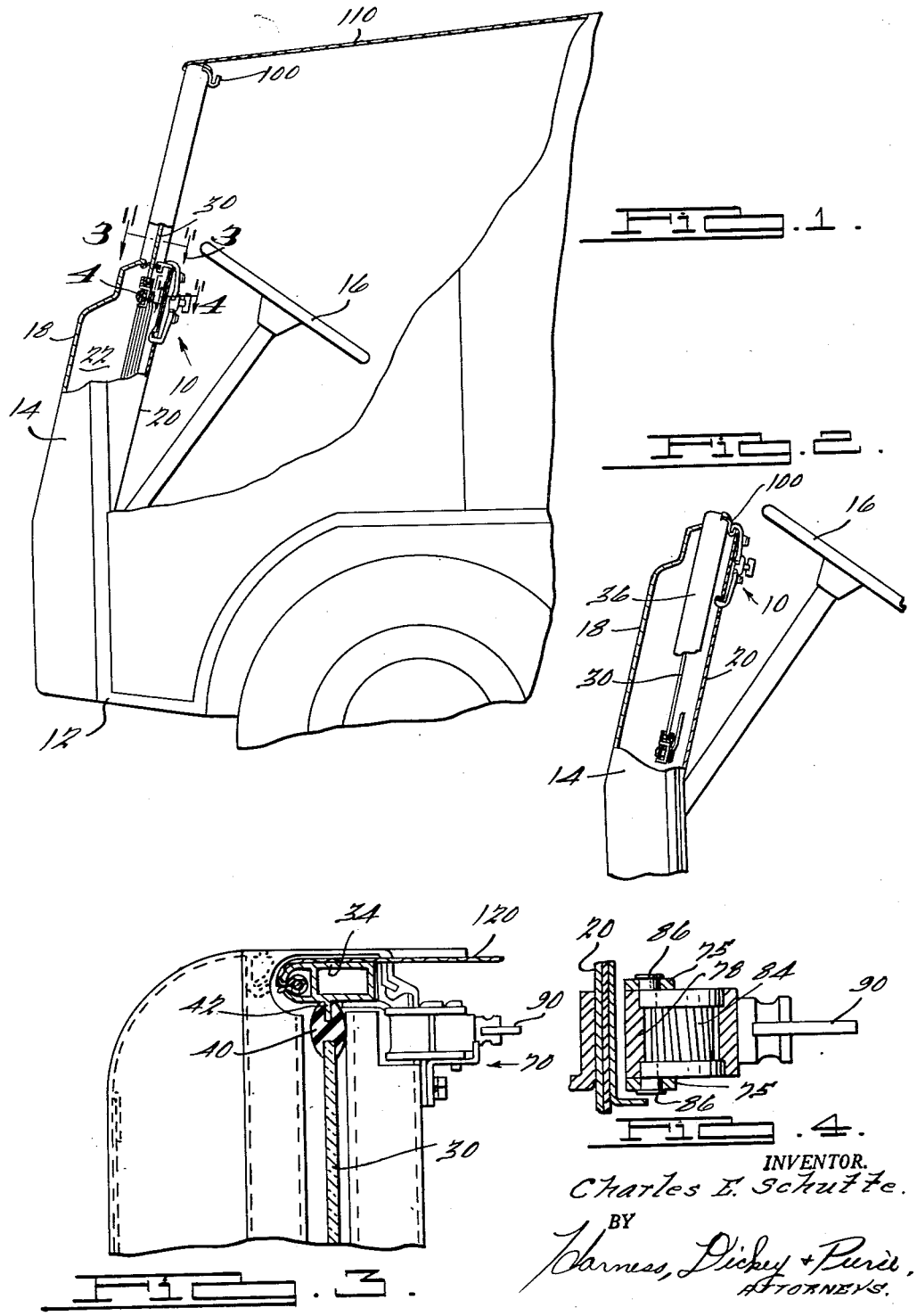

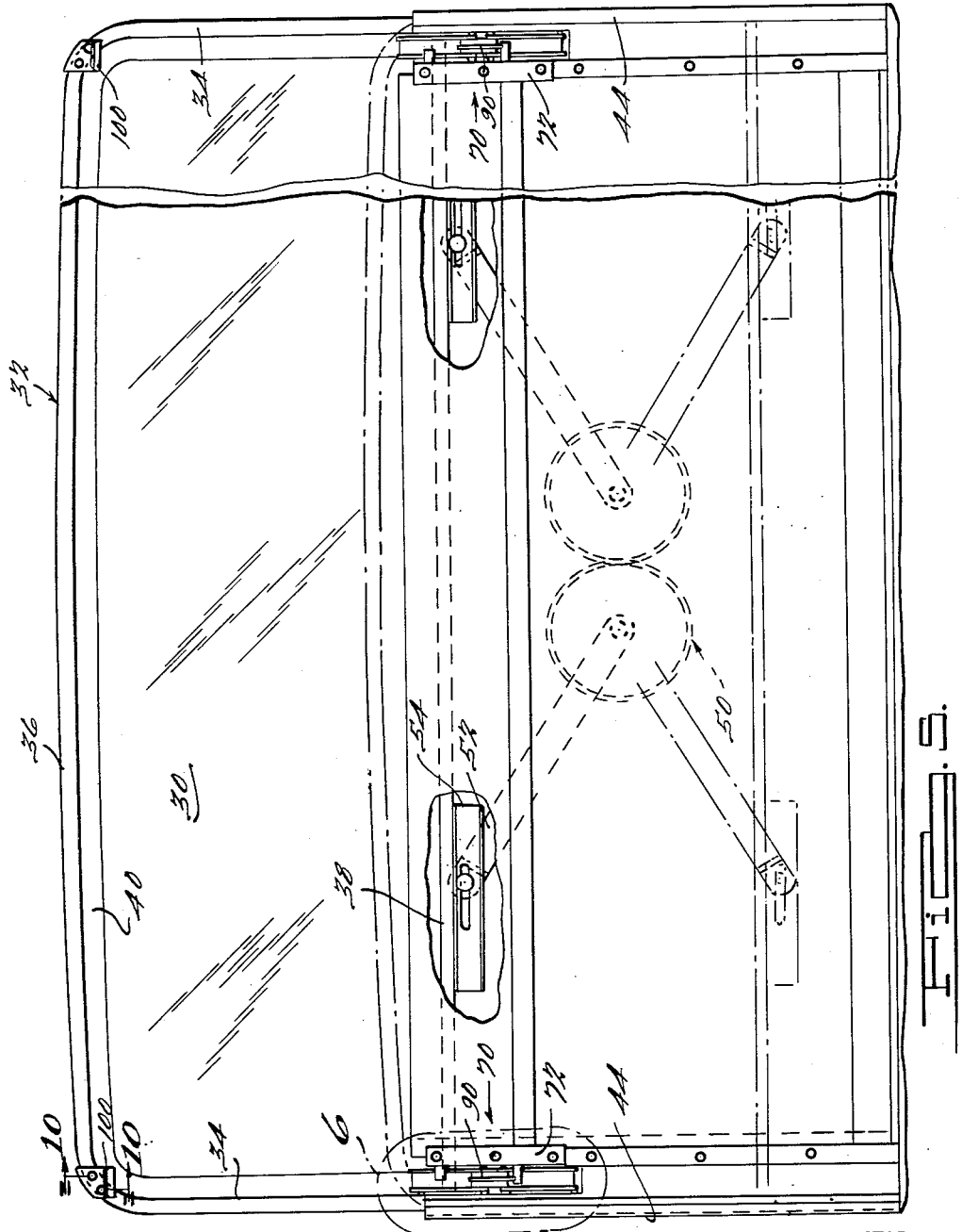

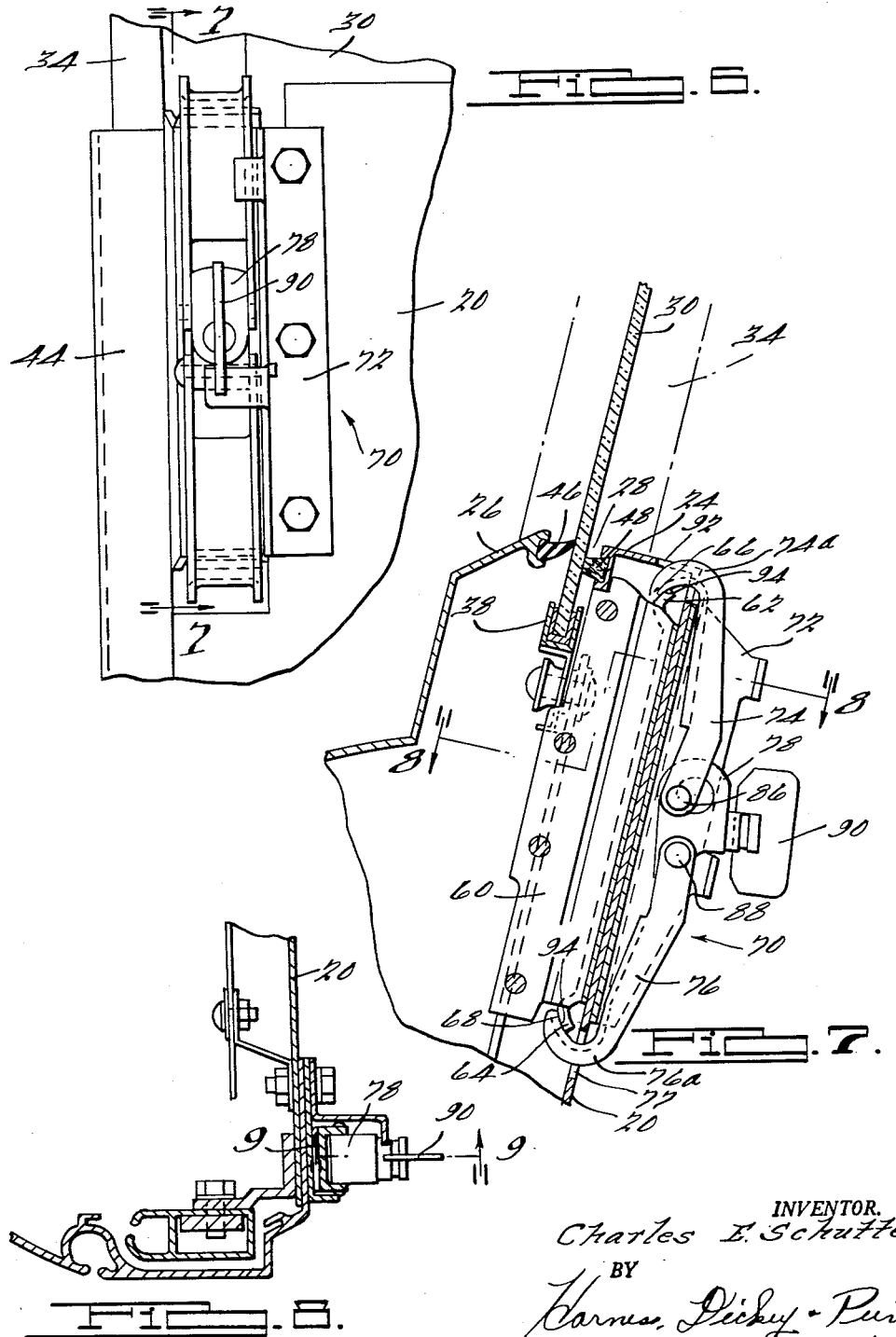

INVENTOR.
Charles E. Schutte.
BY
Harness, Dickey & Pierce
ATTORNEYS.

United States Patent Office 3,026,140
Patented Mar. 20, 1962

3,026,140
VEHICLE WINDSHIELD ASSEMBLY
Charles E. Schutte, Grosse Pointe Woods, Mich., assignor to Willys Motors, Inc., Toledo, Ohio, a corporation of Pennsylvania
Filed Mar. 30, 1959, Ser. No. 802,881
7 Claims. (Cl. 296—84)

This invention relates generally to automotive vehicles and more particularly to a movable windshield assembly in a vehicle.

Military and multipurpose vehicles sometimes require a windshield and at other times are better adapted for performing their intended functions if they are without any windshield. Furthermore, in the case of open top or open platform vehicles of this type, the storage and shipping problems are simplified and the costs are reduced if they are without the usual upwardly projecting windshield because they can be stacked in a smaller space.

It is an object of this invention, therefore, to provide a vehicle of this type with a windshield assembly which is movable between an upper operative position extending upwardly from the cowl and a lower inoperative position within the cowl, and in which locking means is provided that is operable from within the vehicle to securely lock the windshield in both positions against damaging vibrations and rattling, and in which the windshield frame is provided with structure which adapts it for attachment to the top and side members for the vehicle when it is provided with an occupant enclosure.

A further object of this invention is to provide a windshield assembly which is simple in construction, economical to manufacture and install and which is readily moved between an upper operative position and a lower enclosed inoperative position and is locked in both positions.

Further objects, features and advantages of this invention will become apparent from a consideration of the following description, the appended claims and the accompanying drawing, in which:

FIGURE 1 is a fragmentary foreshortened side elevational view of a vehicle equipped with the windshield assembly of this invention, and showing the windshield assembly in an upper operative position;

FIG. 2 is a foreshortened side elevational view illustrated similarly to FIG. 1 showing the windshield in a lower position enclosed within the vehicle cowl;

FIG. 3 is a fragmentary enlarged sectional view looking substantially along the line 3—3 in FIG. 1;

FIG. 4 is a sectional view taken substantially along the line 4—4 in FIG. 1;

FIG. 5 is a rear view of the cowl portion of the vehicle shown in FIGS. 1 and 2 illustrating the windshield in its upper position in solid lines and in its lower position in broken lines;

FIG. 6 is an enlarged fragmentary view of the portion of the windshield assembly enclosed within the line indicated at "6" in FIG. 5;

FIG. 7 is a sectional view looking along the line 7—7 in FIG. 6;

FIG. 8 is a sectional view looking substantially along the line 8—8 in FIG. 7;

Figure 9:
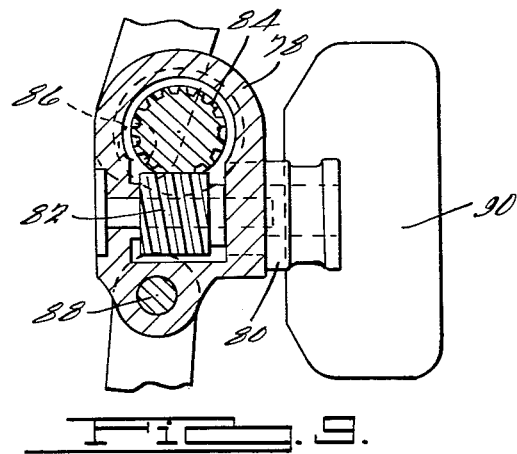
FIG. 9 is a sectional view looking along the line 9—9 in FIG. 8.

With reference to the drawing, the windshield assembly of this invention, indicated generally at 10, is illustrated in FIGS. 1 and 2 in assembly relation with a vehicle 12 of the military or multipurpose forward control type having an upwardly extending cowl 14 at its front end, a steering wheel 16 disposed adjacent the cowl 14 and an engine (not shown) disposed at some convenient location rearwardly of the cowl 14. The front and rear walls 18 and 20, respectively, of the cowl 14 are spaced apart so as to define a cavity or chamber 22 therebetween. The rear wall 20 has a forwardly extending portion 24 at its upper end and front wall 18 is shaped adjacent its upper end with a rearwardly extending portion 26 which terminates in a spaced relation with the rear wall portion 24 so as to form therebetween an entrance slot or opening 28 at the upper end of the cavity 22.

The windshield assembly 10 includes the usual glass 30 and a frame 32 which carries the glass 30 and is provided with side portions 34, a top portion 36 and a bottom portion 38. A rubber sealing strip 40 extends around three sides of the glass 30 and fits on an inwardly extending projection 42 carried by the frame 32 for mounting the glass 30 on the frame.

The frame 32 is of a size such that the side members 34 therefor are guidably supported in the side portions 44 of the cowl 14 when the frame bottom portion 38 is disposed within the cowl 14 as shown in FIG. 5. The glass 30 extends upwardly through the slot 28 and is engaged by the usual weather seal members 46 and 48 carried by the cowl front and back wall top portions 26 and 24, respectively.

Disposed within the cavity 22 is a conventional windshield raising and lowering mechanism, designated generally at 50 in FIG. 5, which by itself forms no part of the present invention. The raising and lowering mechanism 50 includes a pair of movable arms 52 which are connected to horizontal members 54 which support the lower windshield frame member 38. The arms 52 are swingable up and down to raise and lower the supporting members 54 to in turn raise and lower the windshield frame 32 between the upper and lower positions shown in solid and broken lines, respectively, in FIG. 5.

A pair of bracket members 60 are secured to the lower end of the frame 32 adjacent opposite sides thereof so that each bracket 60 is movable between the upper position therefor shown in FIG. 7 and a lower position adjacent the bottom end of the cavity 22. Each of the brackets 60 includes a pair of upper and lower vertically spaced cam members 62 and 64, respectively. The cam member 62 includes an upwardly and rearwardly inclined cam surface 66 and cam member 64 includes a corresponding downwardly and rearwardly inclined cam surface 68. In the upper position of the windshield frame 32, each bracket member 60 is disposed adjacent to and forwardly of a windshield locking assembly 70.

Each of the locking assemblies 70 includes a bracket 72 secured to the rear cowl wall 20 and upper and lower arms 74 and 76 having hook shape outer end portions 74a and 76a, respectively. The arms 74 and 76 are supported at their inner ends on a body 78 carried by the bracket 72 at a position substantially midway between the upper and lower ends thereof. The body 78 (FIGS. 4 and 9) supports a worm shaft 80 which carries a worm gear 82 that meshes with a horizontal gear member 84 that carries a pair of pins 86 which extend parallel to the axis of gear 84 on opposite sides of the body 78. On rotation of the gear member 84, the pins 86 are rotatable along a circle extending about the axis of rotation of the gear member 84.

The lower end of the upper arm 74 is bifurcated, having horizontally spaced portions 75 supported on the pins 86. The upper end of the lower hook-shape arm 76 is similarly supported on a pivot 88 carried by the body 78. The worm shaft 80 carries a key-type handle 90 which can be readily manually manipulated to rotate the worm 82 to in turn rotate the gear member 84 so that the lower portions 75 of the upper arm 74 are moved either downwardly or upwardly depending on the direction of rotation of the handle 90 and the location of the pin members 86 on their circle of travel.

When the windshield frame 32 is in its upper position, so that the brackets 60 are located opposite the locking assemblies 70, each locking assembly is operable in the following manner to lock the windshield frame 32 in the upper position. With the pins 86 located on the top side of the circle which they travel about the axis of the gear member 84, the upper end 74a of the arm 74 is extended through an opening 92 in the rear cowl wall 20 and engaged with the upper cam 62. The lower end 76a of the arm 76 is extended through a cowl opening 77 and similarly engaged with the lower cam 64. The handle 90 is then rotated in a direction to move the pin members 86 downwardly to in effect move the hook-shape end of the arm 74 toward the arm 76.

The inner terminal end surfaces 94 of the hook-shape arm ends are of a shape to complement the shape of the cam surfaces 66 and 68 so that when the surfaces 94 are moved toward each other, they not only clamp opposite sides of the cam members 62 and 64, but they coact with the cam surfaces 66 and 68 to provide for a clamping of the cam members 62 and 64 between the surfaces 94 and the rear cowl wall 20. This double action of the surfaces 94 to provide for both vertical and horizontal clamping of the cam members 62 and 64 effectively locks the windshield frame 32 in its upper position.

Figure 10:
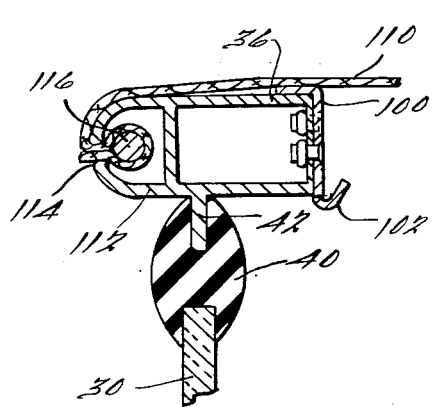
FIG. 10 is an enlarged sectional view looking along the line 10—10 in FIG. 5.

When the windshield is to be lowered, the handles 90 are manipulated to move the pin members 86 upwardly to loosen the engagement of the arms 74 and 76 with the cam members 62 and 64. The arm members 74 and 76 are then manually moved out of engagement with the cam members 62 and 64 to release the windshield frame 32 for downward movement, in response to operation of the lowering mechanism 50, to a position substantially fully enclosed within the cavity 22. In this lower position of the windshield frame 32, a pair of bracket members 100 (FIG. 10) which are carried by the top frame member 36, adjacent opposite ends thereof, are disposed adjacent the upper ends 74a of the locking arms 74 in the locking assemblies 70. The arms 74 are readily engaged with the hook-shape lower ends 102 of the brackets 100 and then the handles 90 are rotated in a direction to provide for downward movement of the supporting pins 86 for the arms 74. This movement securely engages the arm end portions 74 with the hoop-shape lower ends 102 of the brackets 100 so as to effectively clamp the windshield frame 32 between the raising and lowering mechanism which engages the lower end thereof and the hook-shape arm ends 74a.

It is seen therefore that in both positions of the windshield 32, it is positively restrained against vibration and rattling by the locking assemblies 70. In the upper position of the windshield frame 32, the vehicle top member 110 can be readily attached to the frame member 36 because of its configuration with the hollow portion 112 having a narrow entrance opening 114. The flexible top member 110 is extended through the opening 114 and a retaining bar or rod 116 in the loop-shaped end of the top member 110 retains it within the member 112. The frame side members 34 are similarly formed for connection to flexible side members 120 on the vehicle.

Figure 11:
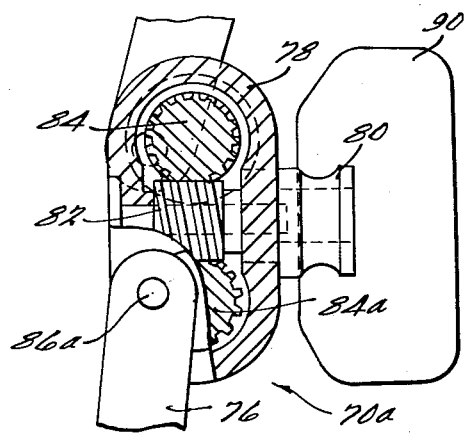
FIG. 11 is an elevational view of a modified form of the locking mechanism in the assembly of this invention.

A modified form of locking mechanism 70a is illustrated in FIG. 11 which is substantially identical to an assembly 70. In the assembly 70a, a second gear 84a, like the gear 84, having connecting pins 86a is connected to the upper end of the lower arm 76. The gear 84a meshes with the worm 82 so that on rotation of the worm 82 in a direction to move the arm 74 downwardly, the arm 76 is moved upwardly and vice versa.

It will be understood that the specific construction of the improved vehicle windshield assembly which is herein disclosed and described is presented for purposes of explanation and illustration and is not intended to indicate limits of the invention, the scope of which is defined by the following claims.

What is claimed is:

1. In a vehicle having a cowl, a windshield, means carried by said cowl supporting said windshield for up and down movement between an upper operative position in which said windshield extends upwardly from said cowl and a lower inoperative position in which the windshield is substantially enclosed within said cowl, and coacting lock means on said cowl and said windshield separate from said supporting means and operable to releasably clamp said windshield in said positions, said coacting lock means including vertically spaced projections at the top and bottom of said windshield.

2. In a vehicle having a cowl provided with an upright cavity, a windshield comprising a generally rectangular frame and a glass mounted in the frame, means carried by said cowl supporting said windshield for up and down movement between an upper operative position in which said windshield extends upwardly from said cowl and a lower inoperative position in which the windshield extends within said cavity to a position in which only the top side of said frame is above said cavity, and coacting lock means on said cowl and said frame separate from said supporting means and operable to releasably clamp said windshield in said positions, said coacting lock means including vertically spaced projections at the top and bottom of said windshield.

3. In a vehicle having a cowl, a windshield comprising a transparent member having a frame, means supporting said windshield on said cowl for movement between an upper operative position in which it extends upwardly from said cowl and a lower inoperative position, brackets carried by horizontally spaced portions of said frame adjacent to the lower end thereof, lock means mounted on said cowl at positions adjacent said brackets in the upper position of said windshield, each of said lock means including a pair of vertically spaced members movable toward each other into engagement with opposite vertically spaced sides of the adjacent bracket for holding said windshield in said upper position.

4. In a vehicle having a cowl, a windshield comprising a transparent member having a frame, means supporting said windshield on said cowl for movement between an upper operative position in which it extends upwardly from said cowl and a lower inoperative position, brackets carried by horizontally spaced portions of said frame adjacent the lower end thereof, lock means mounted on said cowl at positions adjacent said brackets in the upper position of said windshield, each of said lock means including a pair of vertically spaced members movable toward each other into engagement with opposite vertically spaced sides of the adjacent bracket for holding said windshield in said upper position, and handles for said lock means operable from inside said vehicle.

5. In a vehicle having a cowl provided with a windshield receiving cavity, a windshield comprising a transparent member having a frame of a size to fit in said cavity, means supporting said windshield on said cowl for movement between an upper operative position in which it extends upwardly from said cowl and a lower inoperative position in said cavity, brackets carried by horizontally spaced portions of said frame adjacent the lower end thereof, lock means mounted on said cowl at positions adjacent said brackets in the upper position of said windshield, each said lock means including a pair of vertically spaced members movable toward each other into engagement with opposite vertically spaced sides of the adjacent bracket for holding said windshield in said upper position, and upper bracket members mounted on said frame adjacent the top side thereof and disposed adjacent said lock means in the lower position of said windshield, said lock means being operable to engage said upper bracket members and releasably hold said windshield in said lower position.

6. In a vehicle having a cowl, a windshield comprising a transparent member having a frame, means supporting said windshield on said cowl for movement between an upper operative position in which it extends upwardly from said cowl and a lower inoperative position, brackets carried by horizontally spaced portions of said frame adjacent the lower end thereof, lock means mounted on said cowl at positions adjacent said brackets in the upper position of said windshield, each of said lock means including a pair of vertically spaced members movable toward each other into engagement with opposite vertically spaced sides of the adjacent bracket for holding said windshield in said upper position, and coacting cam surfaces on said bracket sides and said vertically spaced lock members providing for a clamping of said bracket between said cowl and said lock members on movement of said lock members toward each other.

7. In a vehicle having a cowl provided with a windshield receiving cavity, a windshield comprising a transparent member having a frame of a size to fit in said cavity, means supporting said windshield on said cowl for movement between an upper operative position in which it extends upwardly from said cowl and a lower inoperative position in said cavity, brackets carried by horizontally spaced portions of said frame adjacent the lower end thereof, lock means mounted on said cowl at positions adjacent said brackets in the upper position of said windshield, each said lock means including a pair of vertically spaced members movable toward each other into engagement with opposite vertically spaced sides of the adjacent bracket for holding said windshield in said upper position, said lock means including a gear member rotatable about a horizontal axis, and means pivotally connecting one end of one of said lock members to said gear member at a position spaced from the axis thereof.

References Cited in the file of this patent

UNITED STATES PATENTS

| | | |
|---|---|---|
| 893,483 | Gray | July 14, 1908 |
| 1,393,239 | Morriss | Oct. 11, 1921 |
| 1,627,579 | Stevens | May 10, 1927 |
| 1,891,765 | Herron | Dec. 20, 1932 |
| 2,261,482 | Myers | Nov. 4, 1941 |
| 2,319,869 | Kramer | May 25, 1943 |
| 2,502,538 | Stark | Apr. 4, 1950 |

FOREIGN PATENTS

| | | |
|---|---|---|
| 64,906 | Austria | May 25, 1914 |
| 521,978 | Great Britain | June 5, 1940 |
| 828,030 | France | Feb. 2, 1938 |